Dec. 12, 1933.                M. CORNELL                1,938,621
                          METERING APPARATUS
                    Filed March 14, 1931      4 Sheets-Sheet 1
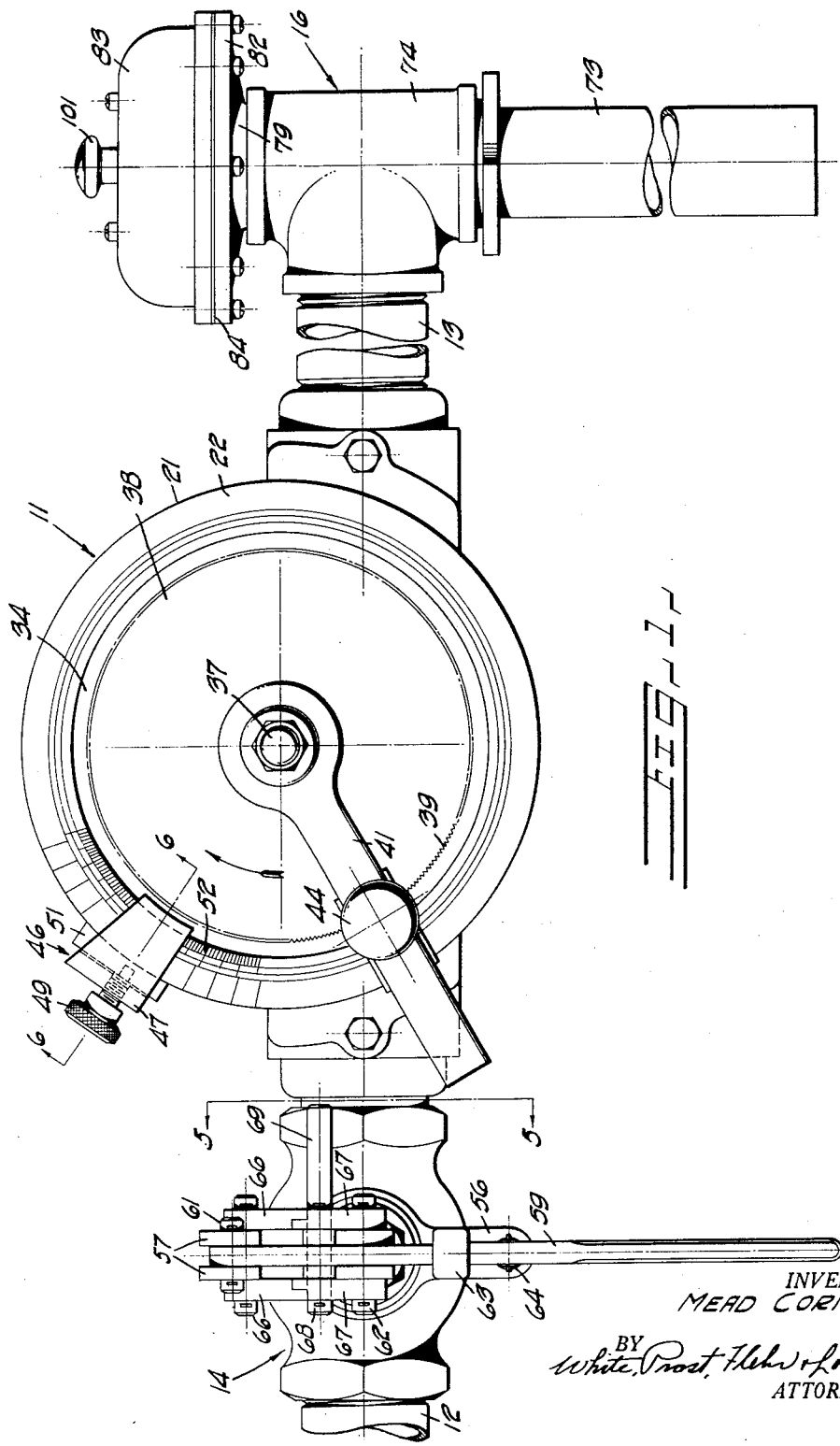

Dec. 12, 1933.                M. CORNELL                    1,938,621
                            METERING APPARATUS
                       Filed March 14, 1931      4 Sheets-Sheet 2
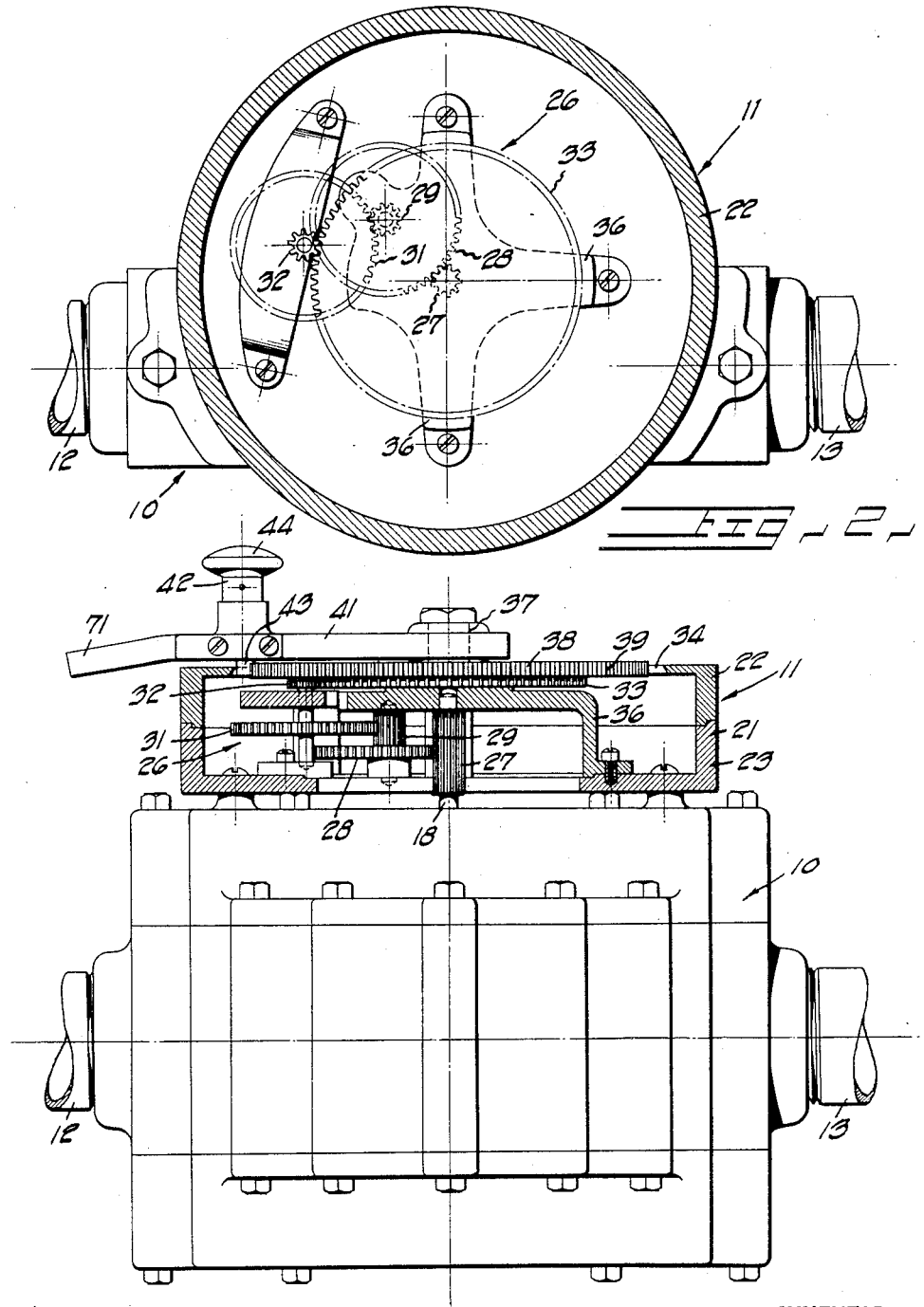

Dec. 12, 1933.                M. CORNELL                    1,938,621
                           METERING APPARATUS
                       Filed March 14, 1931        4 Sheets-Sheet 3
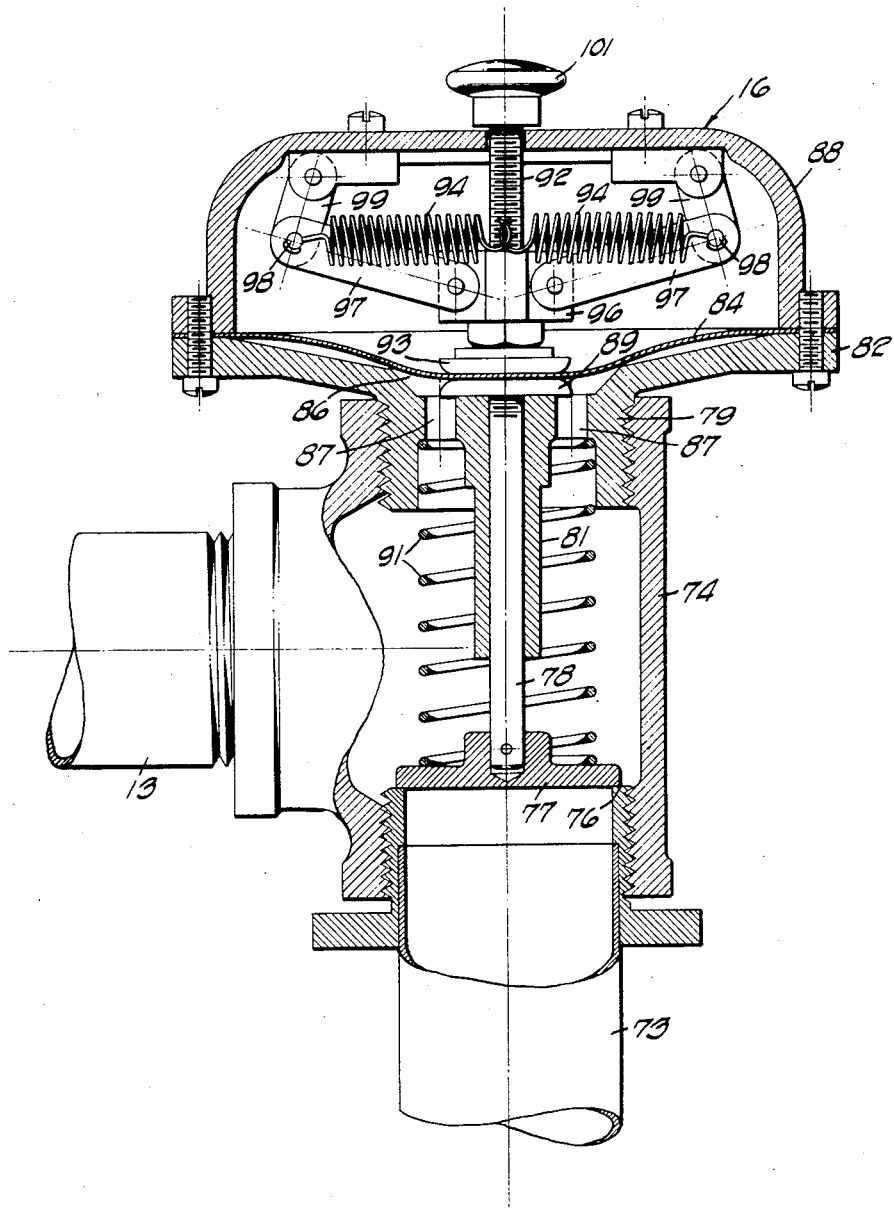
INVENTOR.
MEAD CORNELL
BY
White, Prost, Fletcher Lothrop
ATTORNEYS.

Dec. 12, 1933.　　　M. CORNELL　　　1,938,621
METERING APPARATUS
Filed March 14, 1931　　　4 Sheets-Sheet 4
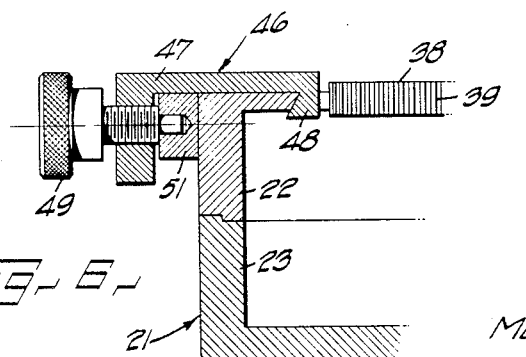
INVENTOR.
MEAD CORNELL
BY
ATTORNEYS.

Patented Dec. 12, 1933

1,938,621

UNITED STATES PATENT OFFICE 1,938,621

METERING APPARATUS

Mead Cornell, San Francisco, Calif., assignor to The Merrill Company, San Francisco, Calif., a corporation of California Application March 14, 1931. Serial No. 522,725

3 Claims. (Cl. 221—101)

This invention relates generally to apparatus for discharging or delivering predetermined quantities of fluid. Such apparatuses can be employed to advantage in filling containers with measured quantities of oil or other liquid.

Apparatuses of the above character commonly utilize a suitable fluid metering device, which imparts motion to a mechanical member in proportion to the rate of flow of fluid. Flow of fluid thru the metering device is controlled by a valve initiated to open position manually. By means of a mechanical interconnection between the metering device and the valve, the valve is automatically closed after a predetermined quantity of fluid has been delivered. In order to increase the adaptability of the apparatus, adjusting means is generally provided so that the quantity of fluid to be dispensed can be varied to suit different requirements and conditions. Adjustments provided on prior apparatuses of this character have not been as accurate and as convenient as desired, and even relatively crude adjustments frequently required the attention of a highly skilled workman. Furthermore such prior apparatuses have been relatively expensive to manufacture because of complicated construction, and they have not been universally reliable in operation.

It is an object of the present invention to devise a metering apparatus of the above character which can be adjusted within comparatively close limits, which can be readily manipulated by an ordinary workman, and which will be simple in construction and reliable in operation.

It is a further object of the invention to devise means in a metering apparatus of the above character whereby injury to the moving parts of the metering device due to sudden interruption of the flow of fluid is obviated, and which will secure a relatively sharp cut-off of fluid at a point of delivery remote from the metering device.

Referring to the drawings:

Figure 1 is a plan view illustrating apparatus incorporating the above invention.

Fig. 2 is a plan view of the measuring head incorporated in my apparatus, the upper portion of the measuring head casing and other associated parts being removed to disclose the gear train.

Fig. 3 is a side elevational view of my measuring head in transverse cross section, the head being shown mounted upon a suitable metering device.

Fig. 4 is a side elevational view, partly in cross section, illustrating an automatically operating valve which I prefer to employ adjacent the end of the discharge conduit or pipe connecting with the metering device.

Fig. 5 is a side elevational view of the fluid control valve which is automatically closed by my adjustable metering head, this view being taken along the line 5—5 of Fig. 1.

Fig. 6 is a cross sectional detail taken along the line 6—6 of Fig. 1.

Referring to Figs. 1 and 3, the apparatus which is preferably utilized in combination with this invention consists of a fluid metering device 10, with which an adjustable head structure 11 is associated. The metering device is provided with an inflow pipe connection 12 and an outflow pipe connection 13. Interposed in the inflow pipe connection 12 there is a valve 14 which is initiated manually to open position, as will be presently explained. Connected with the outflow pipe connection 13 there is a fluid pressure operated valve 16. The metering device 10, as shown in side elevation in Fig. 3, can be of any suitable type, the one shown in my Patent No. 1,753,552 giving good results. Extending from one end of the casing device there is a shaft 18 which rotates in accordance with flow of fluid. As will be presently explained, in operating the apparatus valve 14 is initiated manually to open position and a fluid flow occurs thru the metering device 10 to rotate shaft 18. Valve 16 opens automatically by fluid pressure to permit discharge or delivery of the fluid. According to the setting of adjustable head 11, after a predetermined amount of rotation of shaft 18 has occurred, valve 14 is automatically tripped to closed position, and interruption of the flow of fluid is immediately followed by automatic closure of valve 16.

The detailed construction of the adjustable head 11 can best be understood by reference to Figs. 1, 2 and 3. This structure consists of a casing 21 formed of upper and lower parts 22 and 23. These parts are clamped together by suitable means such as by screws and the entire casing is in turn mounted upon the housing of metering device 10 by suitable means. Positioned within casing 21 there is a gear train 26 operatively connected with shaft 18. This gear train consists of a pinion 27 mounted upon shaft 18, and which engages rotatable gear 28. Pinion 29 rotates together with gear 28, and engages another gear 31. Pinion 32 is rotatable together with gear 31, and engages a gear 33, the mounting of which will be presently explained. Obviously gear 33 is driven at a reduced speed by rotation of shaft 18.

Casing 21 has a circular contour as shown in Figs. 1 and 2. The upper casing part 22 is cut out to provide a circular opening 34. Mounted within casing 21 there is a bracket 36 in which the shafts of certain elements of the gear train 26 are journaled, and to which is fixed an upstanding stud 37 arranged concentric with respect to the casing and with respect to opening 34. A disc 38 is disposed within opening 34 and is superposed upon gear 33. Both gear 33 and disc 38 are mounted to rotate about stud 37, and these parts are connected together so that rotation of gear 33 carries with it disc 38. Disc 38 is provided with a toothed or notched peripheral portion 39 for a purpose which will be presently explained.

Journaled upon and extending outwardly from stud 37 adjacent the outer face of disc 39 there is a trip arm or lever 41. Carried by arm 41 there is a spring pressed locking plunger 42 having a portion 43 capable of effecting locking engagement with the toothed portion 39 of disc 38. By lifting knob 44 of plunger 42, portion 43 can be disengaged from disc 38 to permit arm 41 to swing independently of the disc.

Mounted upon the peripheral portion of casing 21 there is a stop 46 which can be adjustably positioned at various points about the periphery of the casing. A suitable construction for this adjustable stop is illustrated in Fig. 6. Thus in this instance the stop consists of an L-shaped member 47 provided with a portion 48 arranged between the outer periphery of disc 38 and the adjacent inner edge of the upper casing part 22. Member 47 carries manually engageable screw 49, the inner end of which engages a thrust block 51. Upon tightening screw 49, the stop 46 is securely clamped to the casing, and when screw 49 is loosened, the stop can be adjusted to any desired position about stud 37. It may be explained at this point that stop 46 is within the path of movement of arm 41. In order to facilitate locating stop 46 at any desired position, the upper face of the casing is preferably provided with suitable graduations 52. These graduations can be in any units desired, as for example in U. S. gallons.

A desirable form of valve 14 is illustrated in detail in Fig. 5. In this instance it is of the globe or poppet type having a stem 54 reciprocable to open or close the valve. To form a suitable mechanism for effecting actuation of stem 54, the valve casing is provided with a stationary bracket 56. A pair of links 57 have their lower ends connected to bracket 56 by pivot pin 58, and have their upper ends connected to a lever 59 by pivot pin 61. Lever 59 is also pivotally connected to the upper end of stem 54 by pivot pin 62. Slotted member 63, mounted upon and extending upwardly from bracket 56, forms a guide for lever 59. A tensioned spring 64, connected between the lever 59 and bracket 56, serves to normally bias lever 59 towards lowered position and to therefore bias stem 54 towards lowered or closed position. To provide toggle means connecting pins 58 and 62, two pairs of links 66 and 67 are provided. The lower ends of links 66 are pivotally connected to bracket 56 by pin 58 and the upper ends of links 67 are pivotally connected to pin 62. The adjacent ends of the links are pivotally connected together by pin 68. Pin 68 has projecting portions 69 as shown in Fig. 1. In the position of lever 59 shown in Fig. 5 the valve is in open position, and the toggle formed by links 66 and 67 is set. Upon movement of pin 68 to the right as shown in Fig. 5, the toggle formed by links 66 and 67 is broken, and lever 59 is permitted to move downwardly under the tension of spring 64 to immediately close the valve.

Referring to Fig. 1, when valve 14 is operatively positioned with respect to the adjustable head structure 11, pin portion 69 is in the path of movement of the outer end portion 71 of arm 41. Therefore assuming that arm 41 is locked to disc 38, and that it is being driven in a clockwise direction as viewed in Fig. 1 by rotation of shaft 18, it is apparent that as the outer end portion 71 of arm 41 engages pin 69, it will cause valve 14 to be tripped to closed position.

The outflow pipe connection 13 is generally connected to a discharge or delivery spout 73 for delivering the measured quantity of fluid, as for example to deliver a definite quantity of oil to a container. Fluid pressure operated valve 16 is interposed between the outflow pipe connection 13 and spout 73, and therefore fluid can be delivered only when valve 16 is open. A desirable construction for valve 16 is shown in Fig. 4. In this instance it consists of a casing 74 provided with an annular valve seat 76. Vertically movable valve member 77, connected to the lower end of a stem 78, is adapted to cooperate with seat 76. A fitting 79 is threaded into casing 74 and carries a depending tube 81 for guiding stem 78. Fitting 79 has a portion 82 of enlarged diameter, the upper side of which is secured a dome-shaped closure member 83. Flexible diaphragm 84 extends in a general plane at right angles to the axis of stem 78, and has its peripheral portion clamped between portion 82 and member 83. Thus below diaphragm 84 there is formed a fluid pressure chamber 86, which is in communication with the inflow side of valve casing 74, by way of ports 87. Washers 89 and 92, fixed to stem 78, serve to connect the stem to the central portion of diaphragm 84. Valve member 77 is normally biased towards closed position by the compression spring 91.

The upper portion 92 of stem 78 extends above diaphragm 84 thru the dome shaped closure member 83. A further bias is placed upon stem 78, towards either one of two positions past a dead center position, by tension spring 94 operating thru toggle means. Thus a block 96 is secured to stem portion 92, and outwardly extending links 97 have their inner ends pivotally connected with this block. Pivot pins 98 connect the outer ends of links 97 with depending links 99, which are pivotally carried by the dome-shaped closure member 93. Springs 94 have their outer ends connected with pins 98 and their inner ends connected together. Thus when stem portion 92 is moved upwardly to carry with it block 96, it moves past dead center position, beyond which it is biased upwardly by the tension of springs 94. Conversely as it is moved downwardly against the tension of springs 94, it passes the dead center position beyond which it is biased downwardly by tension of spring 94. A knob 101, threaded upon the upper end of rod 92, permits manual manipulation of the valve.

The valve of Fig. 4 operates as follows:—Assuming that fluid pressure is imposed upon the inflow side of the valve casing 74, this fluid pressure is transmitted to chamber 96 thru ports 87, thus causing the center of the diaphragm 84 to be forced upwardly. Upward movement of this diaphragm carries with it stem 78 thru open valve member 77. Stem 78 is also moved upwardly beyond dead center position with respect to toggle levers 97, so that spring 94 tends to retain the valve in full open position. It may be explained at this point that while springs 94 oppose the tension of compression spring 91 when the valve is in open position, the upward holding component created by springs 94 and the associated linkage mechanism is slightly less than the force created by spring 91 tending to close the valve. However the upward component created by spring 94 is sufficient to positively retain the valve in open position for a wide fluctuation of pressures upon the inflow side of the valve. When the pressure upon the inflow side of the valve falls to substantially atmospheric, spring 91 closes valve member 77, and the final closing movement is made more positive by the tension of springs 91, which at this time are creating a component tending to close the valve. The valve which has just been described is far more desirable in my apparatus than a single check valve operating by fluid pressure, as it insures a positive and accurate cut-off, and will not flutter during a measuring operation. Thus it makes possible a more accurate delivery of a measured quantity of liquid where the liquid is delivered thru a hose or outflow pipe to a point remote from the remainder of the apparatus.

Operation of the entire apparatus will be apparent from the preceding description. If it is desired to deliver certain quantities of liquid, as for example 20 gallons for each cycle of operation, stop 46 is set by reference to graduations 52. Arm 41 is then manually released from disc 38, by lifting knob 44, and rotated in a counterclockwise direction until it abuts stop 46. Assuming that the inflow pipe connection 12 extends to a source of liquid under pressure from which a measured quantity is to be removed, lever 59 is raised to open valve 14 and permit the liquid to flow thru the metering device 10. Trip arm 41 immediately begins to rotate slowly in a clockwise direction, by virtue of rotation of shaft 18. As liquid is delivered to valve 16, this valve opens automatically to permit the liquid to be delivered thru spout 73. After a predetermined amount of liquid has passed thru the metering device 10, lever 41 has rotated sufficiently far to engage projecting portion 69 of pin 68, thus causing valve 14 to be automatically tripped to closed position, to interrupt further flow of liquid. The pressure upon the inflow side of valve 16 immediately falls and this valve closes automatically to effect a positive and sharp cutoff of the liquid flow to the spout 73. If the next quantity of liquid to be discharged is to be of the same volume, lever 41 is reset against stop 46, and lever 59 again depressed. If the operator wishes to insure proper accuracy, it is obvious that the temperature of the liquid being dispensed must be taken into account. For example if it is desired to fill each of a great number of containers with the same quantity of oil or other liquid, the operator first sets stop 46 according to graduations 52, and then a quantity of liquid according to this setting is dispensed. This quantity is weighed and if it shows a deficiency or excess due to improper setting of stop 46 or due to temperature conditions, a slight compensating adjustment of stop 46 is made. If the compensating adjustment has been proper, the successive quantities of liquid dispensed will be accurately measured.

I claim:

1. In a fluid metering apparatus, an annular casing, gearing disposed within said casing and adapted to be connected to a metering device, a rotatable disc disposed adjacent one side of the casing and adapted to be driven by the gearing, a lever pivotally secured to the center of the disc, said disc having a serrated edge, a plunger mounted upon the lever and adapted to releasably engage said edge of the disc, and an adjustable stop mounted upon said casing, said stop being within the path of movement of the lever.

2. In a fluid metering apparatus, a metering device having its inflow side connected to a source of liquid under pressure, valve means for controlling flow of liquid thru said device, means for causing said device to automatically close said valve after a predetermined quantity of liquid has passed thru the device, and a fluid pressure operated valve connected to the outflow side of said device, said last mentioned valve including a valve member movable between open and closed positions, and means for biasing said member toward both open and closed positions from an intermediate position.

3. In a fluid metering apparatus, a casing, gearing disposed within the casing and adapted to be connected to a metering device, a rotatable disc disposed adjacent one side of the casing and adapted to be driven by the gearing, a lever pivotally secured to the center of the disc, said disc having a serrated edge, means mounted upon the lever and adapted to releasably engage said edge of the disc, and an adjustable stop member arranged within the path of movement of said lever.

MEAD CORNELL.